United States Patent [19]

Robertson et al.

[11] Patent Number: 4,938,429
[45] Date of Patent: Jul. 3, 1990

[54] FILM CASSETTE

[75] Inventors: Jeffrey C. Robertson, Rochester; Mark D. Fraser, Brockport, both of N.Y.

[73] Assignee: Eastman Kodak Co., Rochester, N.Y.

[21] Appl. No.: 296,541

[22] Filed: Jan. 12, 1989

[51] Int. Cl.⁵ .............................................. G03B 17/26
[52] U.S. Cl. ..................................... 242/71.1; 354/275
[58] Field of Search .................................. 242/71–71.7; 354/275

[56] References Cited

U.S. PATENT DOCUMENTS

| | | | |
|---|---|---|---|
| 2,552,200 | 5/1951 | Mihalyi | 242/71.1 |
| 2,575,024 | 11/1951 | Mihalyi | 242/71.1 |
| 2,731,894 | 1/1956 | Leitz et al. | 95/31 |
| 3,104,846 | 9/1963 | Ringle | 242/71.1 |
| 3,128,058 | 4/1964 | Ringle et al. | 242/71.1 |
| 3,463,409 | 8/1969 | Stark | 242/71.1 |
| 4,407,579 | 10/1983 | Huff | 354/275 |
| 4,423,943 | 1/1984 | Gold | 354/275 |

Primary Examiner—Joseph J. Hail, III
Assistant Examiner—Steven M. duBois

[57] ABSTRACT

A film cassette is disclosed wherein a pair of annular constraining flanges are coaxially spaced on a film spool. The flanges radially confine the outermost convolution of a film roll wound on the spool to prevent the film roll from clock-springing against the cassette shell and thereby hindering film movement. A pair of internal cam members are rotatable from outside of the cassette shell to open a light lock by slightly separating opposite throat portions of the shell. Another pair of internal cam members are rotated with the first pair to flex a limited section of the flanges apart an axial distance sufficient to radially free a corresponding section of the outermost convolution. Then, rotation of the film spool will cause successive sections of the flanges to be momentarily flexed apart, and each freed section of the outermost convolution will be advanced automatically to the outside of the cassette shell.

11 Claims, 7 Drawing Sheets

FILM CASSETTE

CROSS-REFERENCE TO RELATED APPLICATIONS

Reference is made to commonly assigned copending U.S. application Ser. No. 173,396, entitled FILM CASSETTE, and filed Mar. 25, 1988 in the names of Jeffrey C. Robertson and Mark D. Fraser, and U.S. application Ser. No. 193,323, entitled FILM CASSETTE, and filed May 12, 1988 in the name of Jeffrey C. Robertson.

BACKGROUND OF THE INVENTION

1. Field of the Invention

The invention relates generally to the field of photography and particularly to a film cassette containing roll film.

2. Description of the Prior Art

In conventional 35 mm film manufacturers' cassettes, such as manufactured by Eastman Kodak Co. and Fuji Photo Film Co., Ltd., the filmstrip is wound on a flanged spool which is rotatably supported within a hollow cylindrical shell. A free leading end section of the filmstrip approximately 2⅜ inches long, commonly referred to as a "film leader", protrudes from a light-trapped slit or mouth formed between a pair of throat portions of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader section to draw the filmstrip out of the shell.

A 35 mm film cassette has been proposed which, unlike conventional film cassettes, includes a film leader that does not extend outside the cassette shell. The film leader, instead, is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. A trailing end section of the filmstrip is secured to the film spool, and the leading end section of the filmstrip is reduced in width to allow it to protrude from between the circumferential lips and rest against the shell wall. During initial unwinding rotation of the film spool, the leading end section of the filmstrip is advanced automatically to and through a film passageway opening in order to exit the cassette shell. The passageway opening has a width that is slightly less than the width of the filmstrip, which results in the filmstrip being transversely bowed as it is uncoiled from the film spool, and thereby facilitates movement of the film edges under the circumferential lips of the respective flanges. Thus, all that is needed to advance the leading end section of the filmstrip to the outside of the cassette shell via the passageway opening is to rotate the film spool in an unwinding direction. However, transverse bowing of the filmstrip to move its edges under the circumferential lips of the respective flanges results in increased friction between the filmstrip and the cassette structure which will impede advance of the filmstrip from the cassette shell and may damage the filmstrip.

THE CROSS-REFERENCED APPLICATION

Like the type of film cassette disclosed in U.S. Pat. No. 4,423,923, the cross-referenced applications each disclose a film cassette that contains a non-protruding film leader which is automatically advanced to the outside of the cassette shell in response to initial rotation of the film spool in an unwinding direction.

Specifically, there is disclosed a film cassette wherein a convoluted film roll is wound on a spool between a pair of coaxially spaced, independently rotatable flanges. The two flanges have respective circumferential annular lips which prevent the outermost convolution of the film roll from clock-springing into contact with the cassette shell. When the spool is initially rotated, the flanges may remain substantially stationary and the film roll, since its inner end is secured to the spool, tends to expand radially to ensure a non-slipping relation between the outermost convolution and the annular lips. Once the non-slipping relation exists, rotation of the spool will rotate the flanges. This allows stationary internal spreaders to deflect successive sections of the annular lips to an axial dimension exceeding the film width, in turn allowing corresponding sections of the outermost convolution to exit from the radial confinement of the lips without damaging the filmstrip. Stationary internal guides then direct each freed section of the outermost convolution to the outside of the cassette shell in response to rotation of the spool.

SUMMARY OF THE INVENTION

The invention represents an alternative different approach to the one disclosed in the cross-referenced applications.

According to the invention, there is provided an improved film cassette wherein (a) a cassette shell has a pair of throat portions defining a film passage slit to the outside of said cassette shell (b) a leading end section of the outermost convolution of a film roll wound on a film spool is advanced automatically to the outside of the cassette shell via the film passage slit in response to rotation of the film spool in an unwinding direction, and (c) a pair of annular constraining flanges coaxially spaced on the film spool radially confine the outermost convolution to prevent the film roll from radially expanding against the cassette shell and are rotatable with the film spool in the unwinding direction to ensure the advancement of the leading end section of the outermost convolution to the outside of the cassette shell, and wherein the improvement comprises:

said constraining flanges adapted to be flexed apart along successive sections an axial distance sufficient to radially free corresponding sections of the outermost convolution, to permit each freed section of the outermost convolution to be advanced to the outside of the cassette shell via the film passage slit, when the constraining flanges are rotated with the film spool in the unwinding direction;

a pair of flange camming members mounted for movement between a camming position for flexing respective sections of the constraining flanges apart said axial distance and a non-camming position for allowing the flexed sections to return to an original state; and control means accessible at the outside of the cassette shell for moving the flange camming members between their camming and non-camming positions.

Further according to the invention, the improvement comprises:

light lock means arranged at the throat portions of the cassette shell for providing a light lock in the film passage slit;

said throat portions adapted to be slightly separated to open the light lock;

a pair of throat camming members mounted for movement between a camming position for slightly separating the throat portions and a non-camming position for allowing the throat portions to return to an original state; and said control means adapted to move the throat camming members to their camming positions when the control means moves the flange camming members to their camming position and to move the throat camming members to their non-camming position when the control member moves the flange camming members to their non-camming position.

Still further according to the invention, the improvement comprises:

at least one film guiding member mounted for movement between a guiding position for guiding each freed section of the outermost convolution to the film passage slit and a non-guiding position; and said control means adapted to move the guiding member to its guiding position when the control means moves the flange camming members and the throat camming members to their camming positions and to move the guiding member to its non-guiding position when the control means moves the flange camming members and the throat camming members to their non-camming positions.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
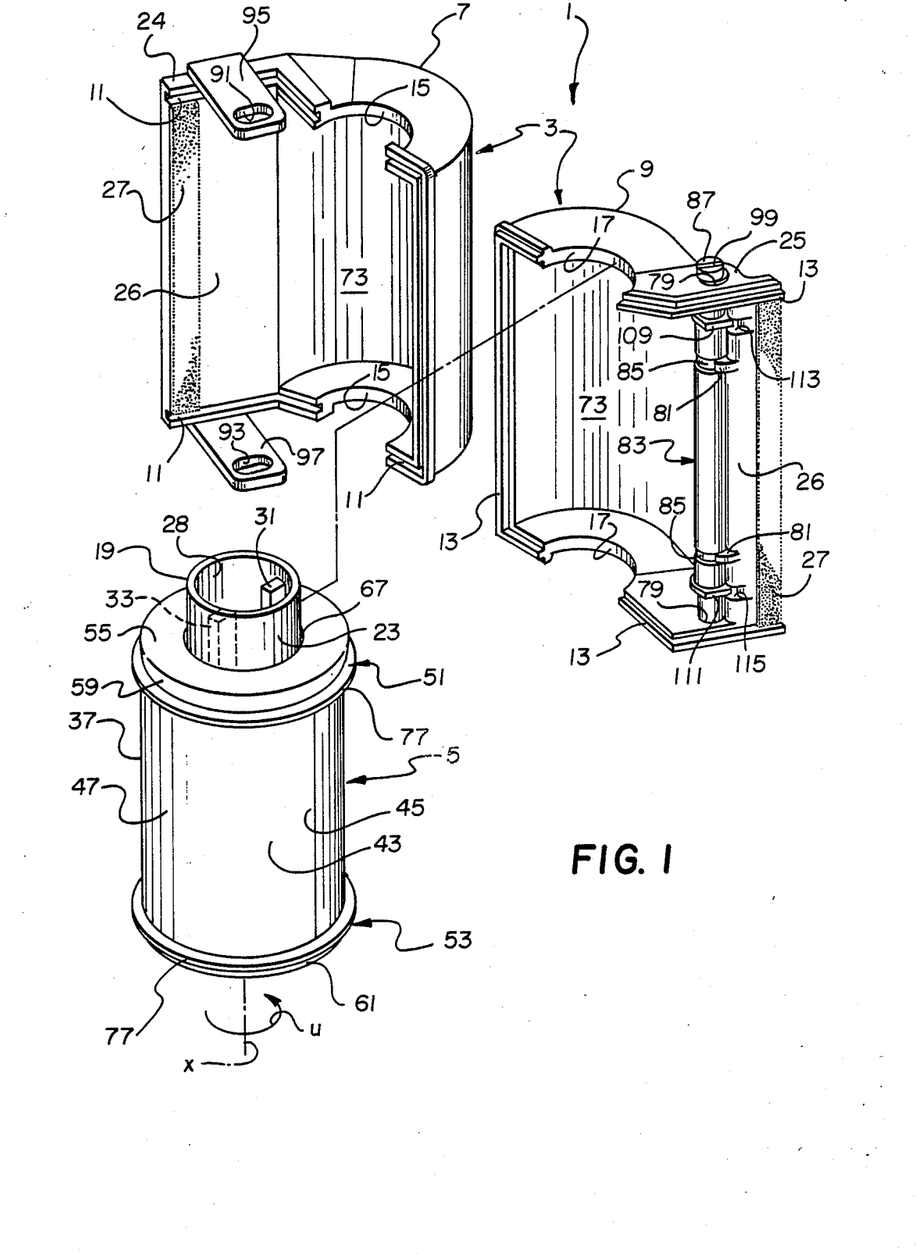
FIG. 1 is an exploded perspective view of an improved film cassette according to a preferred embodiment of the invention.
Figure 3:
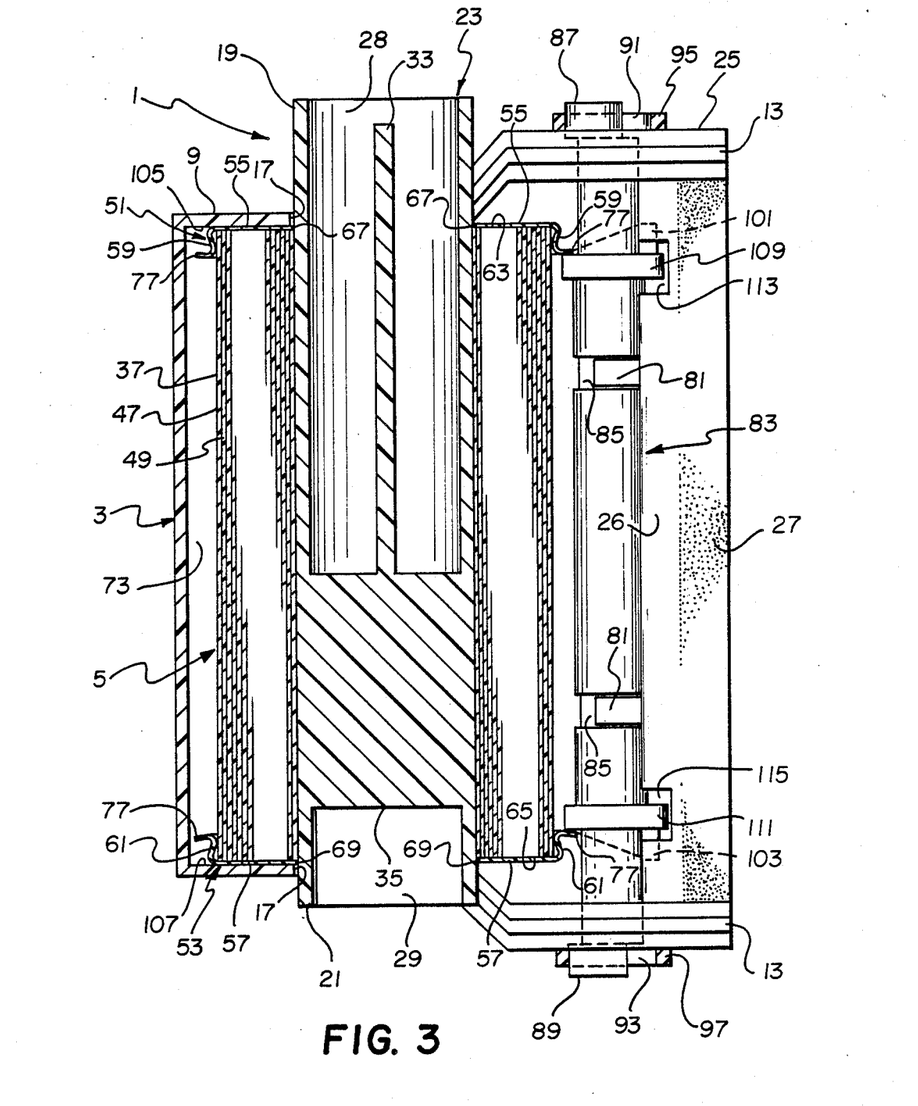
FIGS. 3 and 4 are elevation views in cross-section of the improved film cassette.

Referring now to the drawings, FIGS. 1 and 3 illustrate an improved 35 mm film cassette 1 comprising a light-tight cassette shell 3 and a film spool 5 which is rotatable about an axis X within the cassette shell. The cassette shell 3 consists of two shell halves 7 and 9 which are tightly mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they include respective throat portions 24 and 25 between which is formed a light-trapped film passage slit 26 to the outside of the cassette shell 3. The light-trapping means for normally preventing ambient light from entering the film passage slit 26 may be a known velvet or plush material 27 which lines the interior of the slit. Alternatively, a light-trapping labyrinth may be provided within the slit.

The spool core 23 as shown in FIGS. 1 and 3 includes relatively longer and shorter coaxial holes 28 and 29 opening at the respective longer and shorter opposite end extensions 19 and 21 of the spool core. A pair of spaced keying ribs 31 and 33 integrally formed with the spool core 23 are located within the longer coaxial hole 28, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a winding direction opposite to the unwinding direction.

Figure 5:
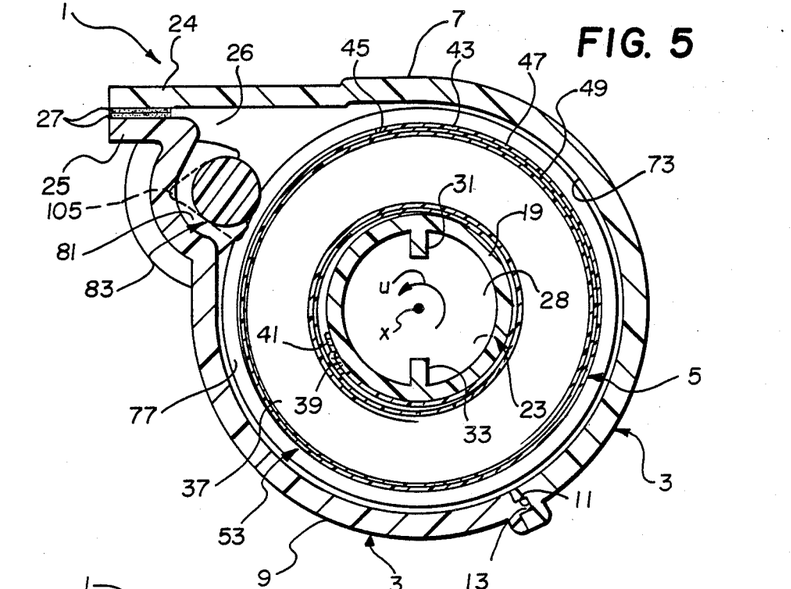
FIGS. 5 and 6 are end views in cross-section of the improved film cassette.
Figure 6:
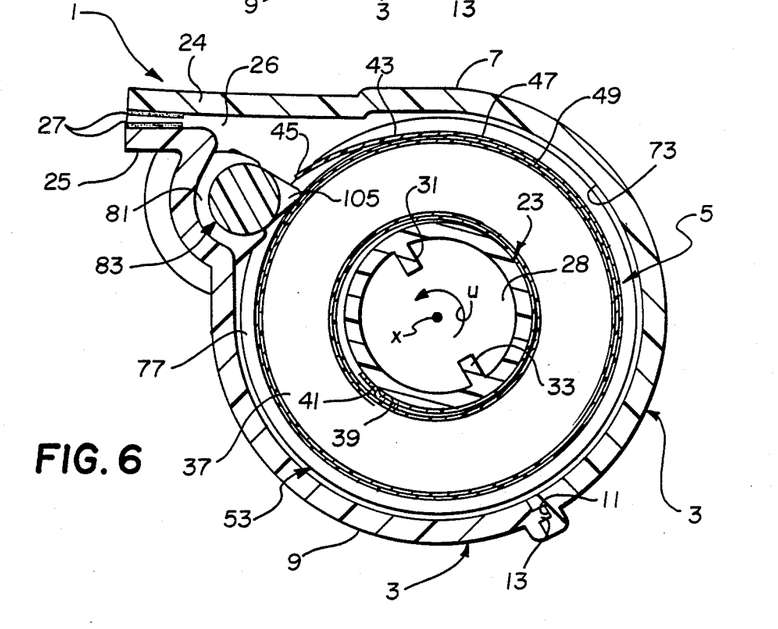

A roll 37 of convoluted 35 mm film having a uniform width is wound about the spool core 23. As indicated in FIGS. 5 and 6, the film roll 37 has an inner or trailing end 39, attached to the spool core 23 by a suitable piece of adhesive tape 41, and a film leader 43. The film leader 43 has a leading or forward end 45 and comprises 2-3 convolutions of the film roll 37. One of these leader convolutions is the outermost convolution 47 and another of them is the next inward succeeding convolution 49.

Figure 9:
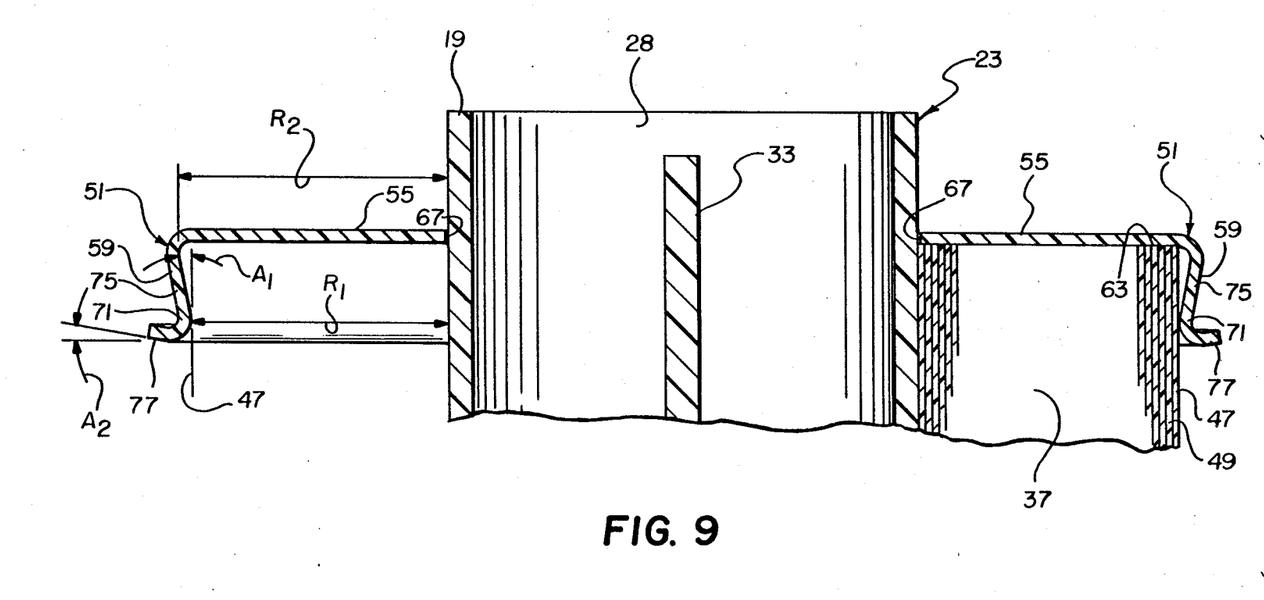
FIG. 9 is a partial elevation view in cross-section of a film spool and an annular constraining flange depicted within the improved film cassette in FIGS. 3 and 4.

A pair of identical flanges 51 and 53 are coaxially spaced along the spool core 23 as shown in FIGS. 1 and 3. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the annular lips 59 and 61 as depicted in FIG. 9 includes the following:

(1) an annular constraining section 71 positioned relatively remote from one of the disks 55 and 57 a predetermined radial distance $R_1$ from the spool 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool 23, greater than the radial distance $R_1$, to enable each of the lips to avoid contacting the outermost convolution 47 at a location substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57, toward the outermost convolution 47, to form an acute relief angle $A_1$ with the outermost convolution. See FIG. 9. The relief angle $A_1$ may be 11°45', for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 9) and thereby limit the area of contact between the lips and the outermost convolution. The annular free end section 77 of each of the lips 59 and 61 is tilted slightly upwardly as shown in FIG. 9 to form an acute relief angle $A_2$. The relief angle $A_2$ may be 10°, for example. Thus, as shown in FIG. 3, the lips 59 and 61 are either shaped in the form of a "Z" or an "S".

As shown in FIG. 1, the cassette half 9 includes at its throat portion 25 a pair of opposite aligned bearing openings 79 which, together with a pair of upstanding supports 81, fixed to the throat portion, rotatably support a control shaft 83. The control shaft 83 is arranged crossways of the film passage slit 26 to the outside of the cassette shell 3 and includes respective annular grooves 85 into which the supports 81 extend.

Figure 7:
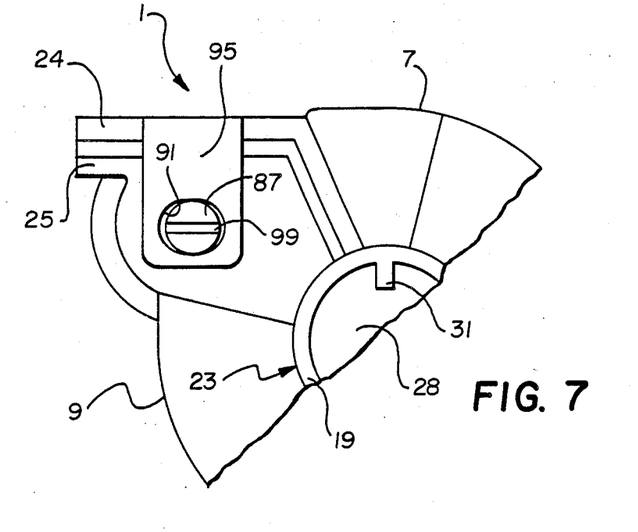
FIGS. 7 and 8 are partial end views similar to FIGS. 5 and 6.
Figure 8:
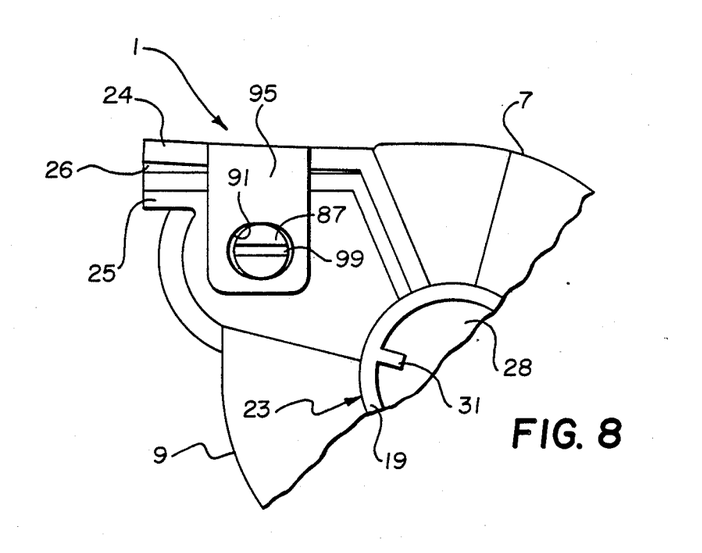

A pair of identical throat camming members 87 and 89, integrally formed with the control shaft 83, are located within respective slots 91 and 93 cut in a pair of identical cam follower extensions 95 and 97 of the throat portion 24 of the cassette half 7. See FIGS. 1–3. The throat camming members 87 and 89 are disposed eccentrically with respect to the control shaft 83 and include respective grooves 99 or other engageable means accessible at the outside of the cassette shell 3 for rotating the control shaft 180° in opposite directions. When the control shaft 83 is rotated 180° in a counterclockwise direction from its orientation in FIG. 7, the throat members 87 and 89 rotate from a non-camming position depicted in FIG. 7 to a camming position depicted in FIG. 8. In the camming position, the throat camming members 87 and 89 cooperate with the cam follower extensions 95 and 97 to open the light lock 27 by slightly separating the throat portions 24 and 25 of the cassette halves 7 and 9. The throat portions 24 and 25 are constructed of a thin flexible material, such as plastic, which allows them to be slightly separated. Alternatively, of course, the cassette halves 7 and 9 might employ a suitable hinge or other conventional means that allows the throat portions 24 and 25 to be opened and closed. When the control shaft 83 is rotated 180° in a clockwise direction from its orientation in FIG. 8, the throat camming members 87 and 89 rotate from their camming position back to their non-camming position to allow the throat portions 24 and 25 to return to their original state.

Figure 4:
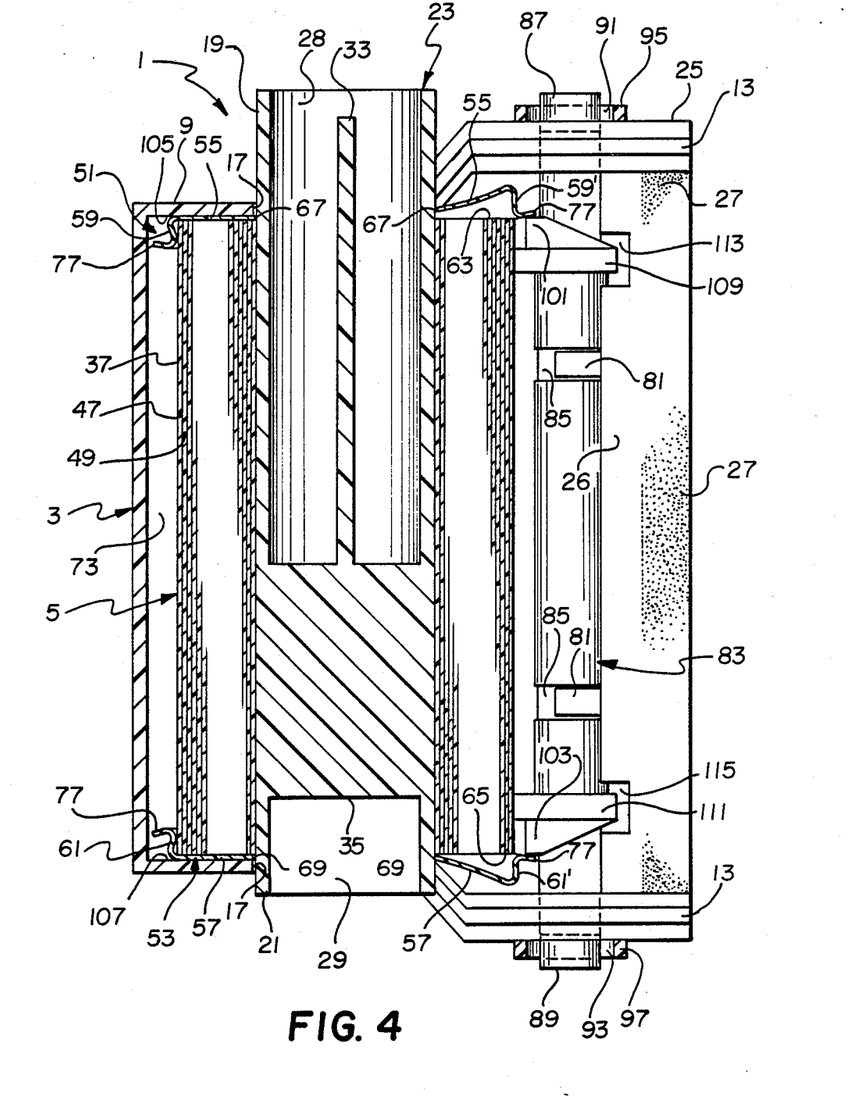

A pair of identical flange camming members 101 and 103, integrally formed with the control shaft 83 and preferably helically shaped, are disposed concentrically with respect to the control shaft at respective locations inwardly of the throat camming members 87 and 89. See FIGS. 2 and 3. When the control shaft 83 is rotated 180° in a counterclockwise direction from its orientation in FIG. 7, the flange camming members 101 and 103 rotate from a non-camming position depicted in FIG. 3 to a camming position depicted in FIG. 4. In the camming position, the flange camming members 101 and 103 deflect opposite limited sections 59' and 61' of the annular lips 59 and 61 of the respective flanges 51 and 53 axially away from each other to an axial dimension slightly exceeding the film width. See FIG. 4. In essence, the deflected portions 59' and 61' of the annular lips 59 and 61 are axially spaced sufficiently to prevent those sections of the lips from radially confining corresponding sections of the outermost convolution 47 of the film roll 37. As indicated in FIG. 4, the remaining sections of the two lips 59 and 61 are maintained in place by inner semi-circular flat surfaces 105 and 107 of the cassette shell 3. The flat surfaces 105 and 107 abut the respective disks 55 and 57 of the two flanges 51 and 53, except in the vicinity of the flange camming members 101 and 103. Thus, the remaining sections of the two lips 59 and 61 continue to radially confine the outermost convolution 47. When the control shaft 83 is rotated 180° in a clockwise direction from its orientation in FIG. 8, the flange camming members 101 and 103 rotate from their camming position back to their non-camming position, allowing each flexed section 59' and 61' of the respective lips 59 and 61 to return to an original state. See FIG. 3.

As shown in FIG. 4, the annular free end section 77 of each of the annular lips 59 and 61, at the deflected portions 59' and 61' of the two lips, bears against the respective flange camming members 101 and 103. Since the annular free end section 77 of each of the lips has a gentle curve to it as best seen in FIG. 9, very little wear occurs between the free end section and either of the flange camming members 101 and 103. The relief angle $A_2$ of the annular free end section 77 of each of the lips is useful during assembly of the film cassette 1 to position either of the flange camming members 101 and 103 relative to an annular free end section.

A pair of identical film stripper-guide members 109 and 111, integrally formed with the control shaft 83, are located adjacent the respective flange camming members 101 and 103. See FIGS. 1–3. The film stripper-guide members 109 and 111 are disposed concentrically with respect to the control shaft 83 and extend partially into respective wells 113 and 115 cut in the throat portion 25 of the cassette half 9. When the control shaft 83 is rotated 180° in counterclockwise direction from its orientation in FIG. 7, the stripper-guide members 109 and 111 rotate from a non-guiding position depicted in FIGS. 3 and 5 to a guiding position depicted in FIGS. 4 and 6. In the guiding position, the stripper-guide members 109 and 111 are available to direct the leading end 45 of the film leader 43 into the film passage slit 26 when the leading end is released from the radial confinement of the annular lips 59 and 61 of the respective flanges 51 and 53. When the control shaft 83 is rotated 180° in a clockwise direction from its orientation in FIG. 8, the stripper-guide members 109 and 11 rotate from their guiding position to their non-guiding position.

OPERATION

At the outset, the control shaft 83 is rotated 180° by suitable means in a camera, for example, to rotate the throat camming members 87 and 89 and the flange camming members 101 and 103 from their non-camming positions to their camming positions, and to rotate the film stripper guides 105 and 107 from their non-guiding position to their guiding position. See FIGS. 4, 6, and 8.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the respective flanges. Then, rotation of the spool core 23 in the same direction will similarly rotate the two flanges 51 and 53. As a result, the flange camming members 101 and 103 will deflect successive sections 59' and 61' of the annular lips 59 and 61 axially away from each other as the respective sections are rotated past the camming members. The deflected sections 59' and 61' of the two lips 59 and 61 are returned to their original non-flexed condition by the semi-circular flat surfaces 105 and 107 of the cassette shell 3. As can be appreciated from FIG. 6, the leading end 45 of the film leader 43 will be freed from the radial confinement of the respective lips 59 and 61 in the vicinity of the flange camming members 101 and 103, and it will be advanced onto the stripper-guide members 109 and 111. The stripper-guide members 101 and 103, in turn, direct the leading end 45 into the film passage slit 26, thereby allowing succeeding sections of the outermost convolution 47 to be freed from corresponding sections of the two lips 59 and 61 as those sections of the respective lips are deflected by the flange camming members 101 and 103. Consequently, continued rotation of the spool core 23 will thrust the film leader 43 from the inside to the outside of the cassette shell 3.

The invention has been described with reference to a preferred embodiment. However, it will be appreciated that variations and modifications can be effected within the ordinary skill in the art without departing from the scope of the invention. For example, the leading end 45 of the film roll 37 could initially be located within the film passage slit 26 rather than be radially confined by the annular lips 59 and 61 of the two flanges 51 and 53 as shown in FIG. 1. Also, the leading end 45 could be tapered to allow it to freely protrude from between the annular lips 59 and 61.

Figure 2:
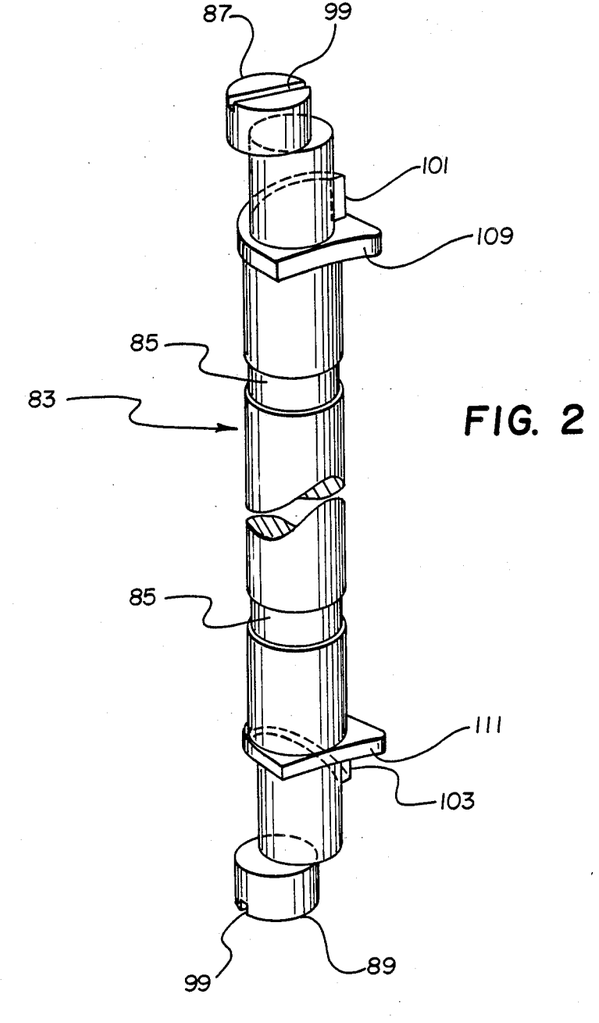
FIG. 2 is an enlarged perspective view of a control shaft depicted within the improved film cassette in FIG. 1.

According to another example, the annular lips 59 and 61 need not be "Z"-shaped or "S"-shaped as shown in FIGS. 2 and 4. Instead, they may have a somewhat different shape. All that is necessary is that the annular lips provide essentially radial contact between themselves and the film roll, without allowing the clock-springing force of the film roll to generate an axial force against either of the flanges 51 and 53.

We claim:

1. An improved film cassette wherein (a) a cassette shell has a pair of throat portions defining a film passage slit to the outside of said cassette shell, (b) a leading end section of the outermost convolution of a film roll wound on a film spool is advanced to the outside of said cassette shell via said film passage slit in response to rotation of said film spool in an unwinding direction, and (c) a pair of annular constraining flanges coaxially spaced on said film spool radially confine said outermost convolution to prevent said film roll from radially expanding against said cassette shell and are rotatable with the film spool in the unwinding direction to ensure the advancement of said leading end section to the outside of the cassette shell, and wherein the improvement comprises:

said constraining flanges adapted to be flexed apart along successive sections an axial distance sufficient to radially free corresponding sections of said outermost convolution, to permit each freed section of the outermost convolution to be advanced to the outside of said cassette shell via said film passage slit, when the constraining flanges are rotated with said film spool in the unwinding direction;

a pair of flange camming members mounted for movement between a camming position for flexing respective sections of said constraining flanges apart said axial distance and a non-camming position for allowing the flexed sections to return to an original state; and control means accessible at the outside of said cassette shell for moving said flange camming members between their camming and non-camming positions.

2. The improvement as recited in claim 1, wherein said flange camming members include respective substantially helical cams mounted for rotation between said camming and non-camming positions.

3. An improved film cassette as recited in claim 1, further wherein light lock means is arranged at said throat portions for normally providing a light lock in said film passage slit, and wherein the improvement further comprises:

said throat portions adapted to be slightly separated to open said light lock;

a pair of throat camming members mounted for movement between a camming position for slightly separating said throat portions and a non-camming position for returning the throat portions to an original state; and said control means adapted to move said throat camming members to their camming position when the control means moves said flange camming members to their camming position and to move the throat camming members to their non-camming position when the control member moves the flange camming members to their non-camming position.

4. The improvement is recited in claim 3, wherein said control means includes a control shaft arranged crossways of said film passage slit and bearing means located on one of said throat portions to support said control shaft for rotation, and wherein said flange camming members and said throat camming members are fixed to said control shaft for rotation by the control shaft to their camming and non-camming positions.

5. The improvement as recited in claim 4, wherein said flange camming members are arranged concentrically with respect to said control shaft and said throat camming members are arranged eccentrically with respect to the control shaft.

6. The improvement as recited in claim 3, further comprising:

at least one film guiding member mounted for movement between a guiding position for guiding each freed section of said outermost convolution to said film passage slit and a non-guiding position; and said control means adapted to move said guiding member to its guiding position when the control means moves said flange camming members and said throat camming members to their camming positions and to move the guiding member to its non-guiding position when the control means moves the flange camming members and the throat camming members to their non-camming positions.

7. The improvement as recited in claim 6, wherein said control means includes a control shaft arranged crossways of said film passage slit and bearing means located on one of said throat portions to support said control shaft for rotation, and wherein said flange and throat camming members and said guiding member are fixed to said control shaft for rotation by the control shaft to their respective positions.

8. An improved film cassette wherein (a) a cassette shell has a film passage slit to the outside of said cassette shell, (b) a leading end section of the outermost convolution of a film roll wound on a film spool is advanced to the outside of said cassette shell via said film passage slit in response to rotation of said film spool in an unwinding direction, and (c) a pair of annular constraining flanges coaxially spaced on said film spool radially confine said outermost convolution to prevent said film roll from radially expanding against said cassette shell and are rotatable with the film spool in the unwinding direction to ensure the advancement of said leading end section to the outside of the cassette shell, and wherein the improvement comprises:

said constraining flanges adapted to be flexed apart along successive sections an axial distance sufficient to radially free corresponding sections of said outermost convolution, to permit each freed section of the outermost convolution to be advanced to the outside of said cassette shell via said film passage slit, when the constraining flanges are rotated with said film spool in the unwinding direction;

flange camming means mounted for movement between a camming position for flexing respective sections of said constraining flanges apart said axial distance and a non-camming position;

film guiding means mounted for movement between a guiding position for guiding each freed section of said outermost convolution to said film passage slit and a non-guiding position; and control means for moving said flange camming means and said film guiding means substantially simultaneously to their camming and guiding positions and substantially simultaneously to their non-camming and non-guiding positions.

9. The improvement as recited in claim 8, wherein said control means includes accessible means located at the outside of said cassette shell for operating the control means to move said flange camming means and said film guiding means to their respective positions.

10. An improved film cassette wherein (a) a cassette shell has a pair of throat portions defining a film passage slit to the outside of said cassette shell and (b) light lock means is arranged at said throat portions for normally providing a light lock in said film passage slit, and wherein the improvement comprises:

said throat portions adapted to be slightly separated to open said light lock;

a pair of throat camming members mounted for movement between a camming position for slightly separating said throat portions and a non-camming position for returning the throat portions to an original state; and control means accessible at the outside of said cassette shell for moving said throat camming members between their camming and non-camming positions.

11. The improvement as recited in claim 10, wherein said control means includes a control shaft arranged crossways of said film passage slit and bearing means located on one of said throat portions to support said control shaft for rotation, and wherein said throat camming members are fixed to said control shaft and the other throat portion includes respective cam follower means which cooperate with said throat camming members to slightly separate said throat portions.

* * * * *

UNITED STATES PATENT AND TRADEMARK OFFICE
CERTIFICATE OF CORRECTION

PATENT NO. : 4,938,429

DATED : July 3, 1990

INVENTOR(S) : J. C. Robertson et al

It is certified that error appears in the above-identified patent and that said Letters Patent is hereby corrected as shown below:

On the title page before item [57] insert --Attorney, Agent or Firm: Roger A. Fields--.

Signed and Sealed this

Twenty-first Day of April, 1992

Attest:

HARRY F. MANBECK, JR.

*Attesting Officer*  *Commissioner of Patents and Trademarks*